United States Patent
Yanai

(10) Patent No.: US 8,442,270 B2
(45) Date of Patent: May 14, 2013

(54) OBJECT DETECTING METHOD AND NON-TRANSITORY COMPUTER-READABLE RECORDING MEDIUM STORING AN OBJECT DETECTION PROGRAM

(75) Inventor: Hirokazu Yanai, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 112 days.

(21) Appl. No.: 13/080,943

(22) Filed: Apr. 6, 2011

(65) Prior Publication Data

US 2011/0262005 A1 Oct. 27, 2011

(30) Foreign Application Priority Data

Apr. 26, 2010 (JP) ................................. 2010-100743

(51) Int. Cl.
*G06K 9/00* (2006.01)
(52) U.S. Cl.
USPC ....................................................... 382/103
(58) Field of Classification Search .................. 382/103, 382/181
See application file for complete search history.

(56) References Cited

U.S. PATENT DOCUMENTS 5,912,985 A * 6/1999 Morimoto et al. ............ 382/151
2010/0034484 A1 * 2/2010 Kido ............................. 382/294

FOREIGN PATENT DOCUMENTS

| JP | 9-304019 | 11/1997 |
| JP | 11-167640 | 6/1999 |
| JP | 2008-234261 | 10/2008 |

* cited by examiner

*Primary Examiner* — Tom Y Lu
(74) *Attorney, Agent, or Firm* — Cooper & Dunham LLP

(57) ABSTRACT

An object detecting method includes dividing a standard pattern into two or more areas radially from a central point; selecting, in each divided area of the standard pattern, a standard pattern pixel position at the maximum distance from the area dividing central point as a standard pattern representative point; dividing a determined pattern into two or more areas; selecting, in each divided area of the determine pattern, a determined pattern pixel position at the maximum distance from the area dividing central point as a determined pattern representative point; determining a positional difference between the standard pattern representative point and the determined pattern representative point in the corresponding divided areas; and determining the determined pattern as a target object when the positional differences in all of the divided areas are within a predetermined range.

8 Claims, 9 Drawing Sheets

OBJECT DETECTING METHOD AND NON-TRANSITORY COMPUTER-READABLE RECORDING MEDIUM STORING AN OBJECT DETECTION PROGRAM

BACKGROUND OF THE INVENTION

1. Field of the Invention

The present invention relates to an object detecting method for detecting a target object in an image, and a non-transitory computer-readable recording medium storing a program for causing a computer to perform an object detecting method.

2. Description of the Related Art

Technologies for detecting an object in an image taken by a camera, e.g., by processing information of the image, are being utilized in various fields of industry. For example, in the field of industrial robots, the information of an image imaged by a camera may be processed to detect an object in the image, and determine a positional error of the object in order to correct the position of an industrial robot. In the field of semiconductor manufacturing, in a size measuring step using length-measurement SEM (scanning electron microscopy) technology, an area around an alignment mark formed on a wafer may be taken by a camera, and the information of the image may be processed to detect the position of the alignment mark so that a position error of the wafer can be corrected.

Such image processing for object detection may involve pattern matching. For example, Japanese Laid-open Patent Publication No. 2008-234261 discusses a pattern matching technology whereby an image of an object is registered in advance, and an image including the object is obtained during an actual operation. Correlation values between the registered image and the image taken during the actual operation are calculated, and the presence or absence of the object or its position is detected based on the correlation values.

Pattern matching for object detection may involve moving a pre-registered standard pattern of a target object over an actual image including a determined pattern, and detecting a position in the image where the correspondence between the standard pattern and the determined pattern is large. Such an object detecting method based on pattern matching may involve the handling of large amounts of information and take a long time for object detection.

SUMMARY OF THE INVENTION

In one aspect, an object detecting method includes dividing an area of a standard pattern into two or more areas radially from an area dividing central point; selecting, in each of the divided areas of the standard pattern, a standard pattern pixel position at the maximum distance from the area dividing central point as a standard pattern representative point; dividing an area of a determined pattern into two or more areas under the same condition as in the step of selecting the standard pattern representative point and with reference to the area dividing central point; selecting, in each of the divided areas of the determine pattern, a determined pattern pixel position at the maximum distance from the area dividing central point as a determined pattern representative point; determining a positional difference between the coordinates of the standard pattern representative point and the coordinates of the determined pattern representative point in the corresponding divided areas; and determining the determined pattern as a target object when the positional differences in all of the divided areas are within a predetermined range.

In another aspect, a non-transitory computer-readable recording medium stores a program that causes a computer to perform the object detecting method.

DETAILED DESCRIPTION OF THE PREFERRED EMBODIMENTS

An embodiment of the present invention is described with reference to an example where an alignment mark used for wafer position error correction is detected as a target object during a size measuring step using a length-measurement SEM in a semiconductor device manufacturing process. In the size measuring step, when the wafer is transported to an XY stage of a length-measurement SEM apparatus, a small wafer position error may be caused. Such a positional error is corrected with reference to the alignment mark. Because the wafer is positioned with reference to a cut-out which may be referred to as an "orientation flat" or a "notch", the positional error of the wafer during the transport to the XY stage may typically consist of displacements in the X or Y directions, with little error in a rotational direction.

Figure 1:
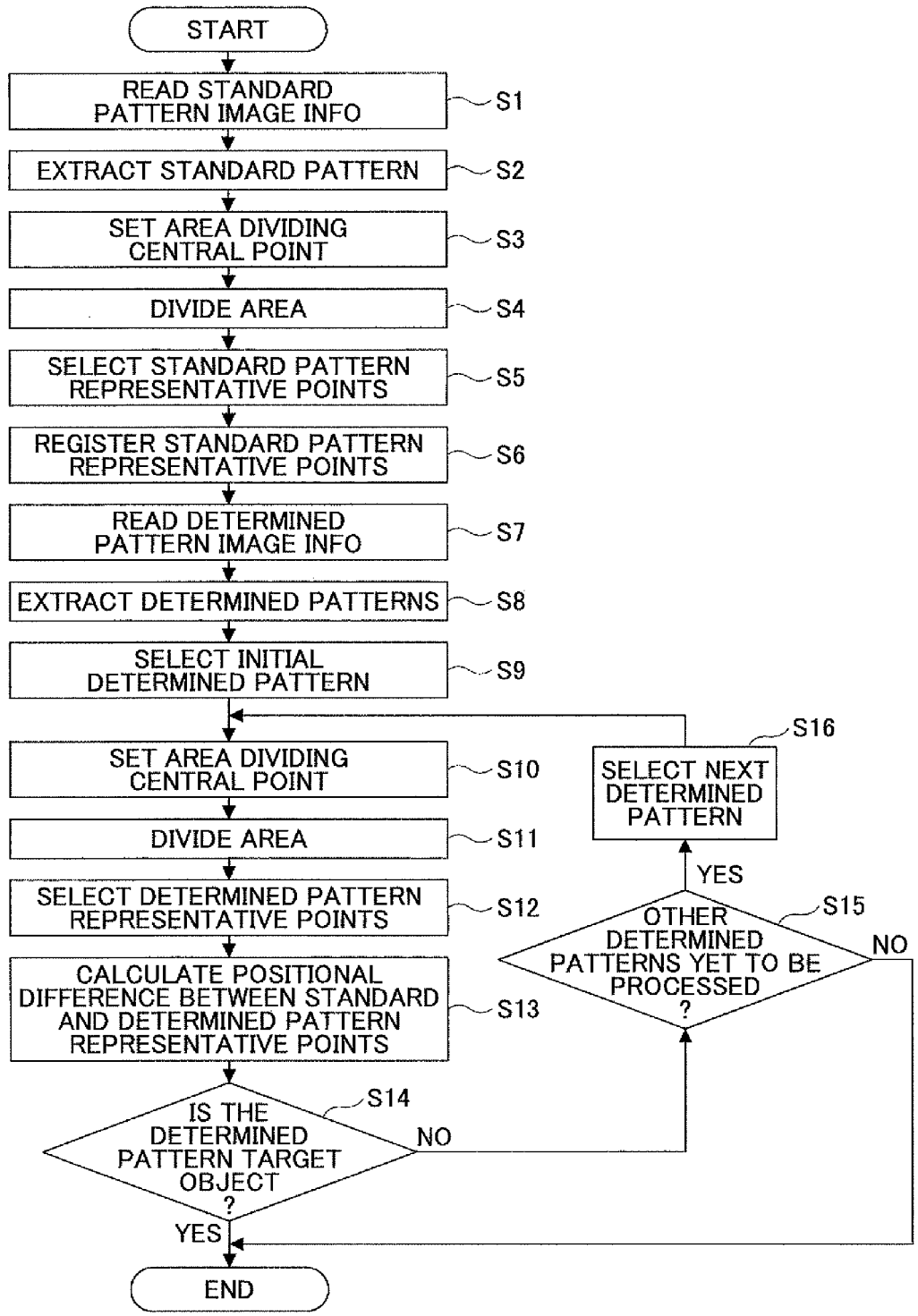
FIG. 1 is a flowchart of a method of detecting a target object according to an embodiment of the present invention.
Figure 2:
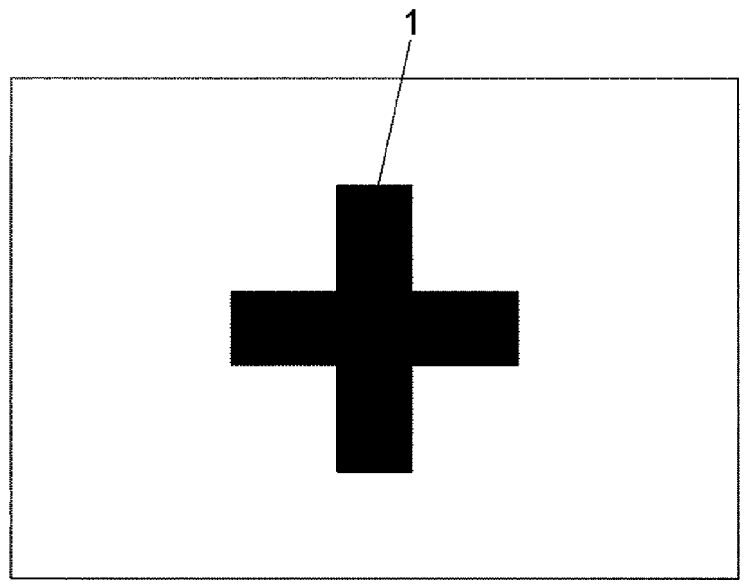
FIG. 2 illustrates a standard pattern.
Figure 3:
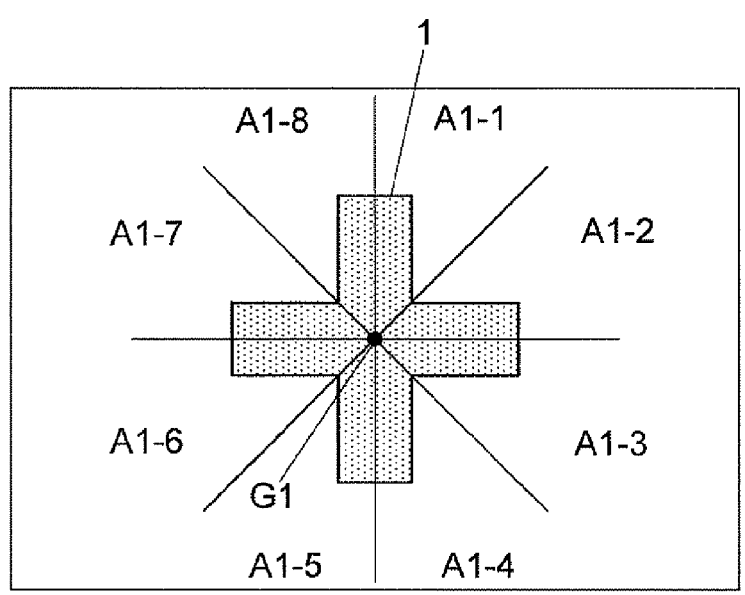
FIG. 3 illustrates an area dividing central point and lines for dividing an area of the standard pattern into eight parts.
Figure 4:
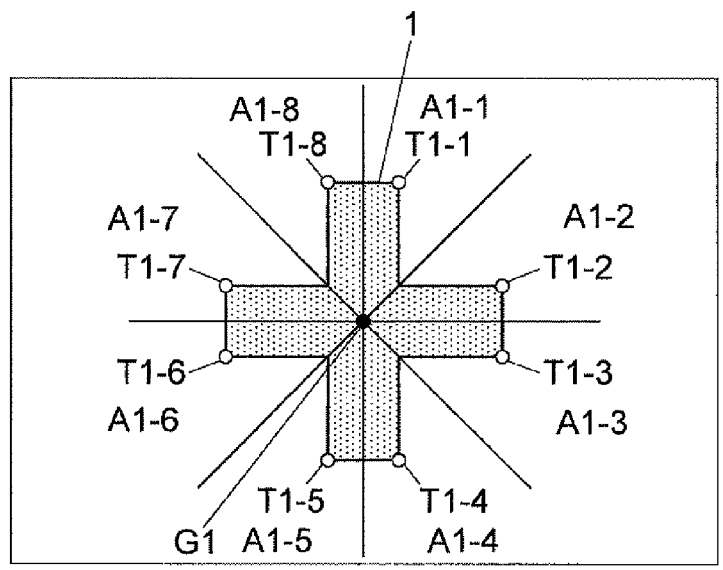
FIG. 4 illustrates representative points of the standard pattern.
Figure 5:
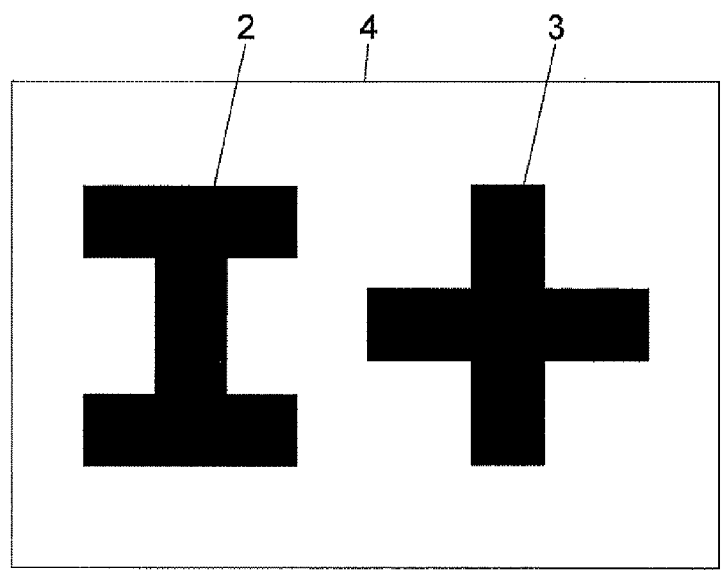
FIG. 5 illustrates a determined pattern image taken of an area around an alignment mark on a wafer, the image showing two determined patterns.
Figure 6:
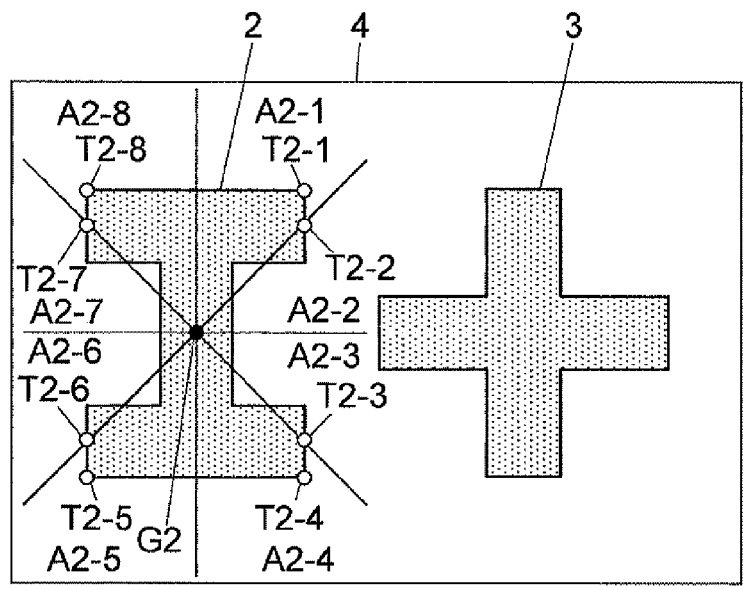
FIG. 6 illustrates an area dividing central point and lines for dividing an area of a first determined pattern into eight parts, and representative points of the first determined pattern.
Figure 7:
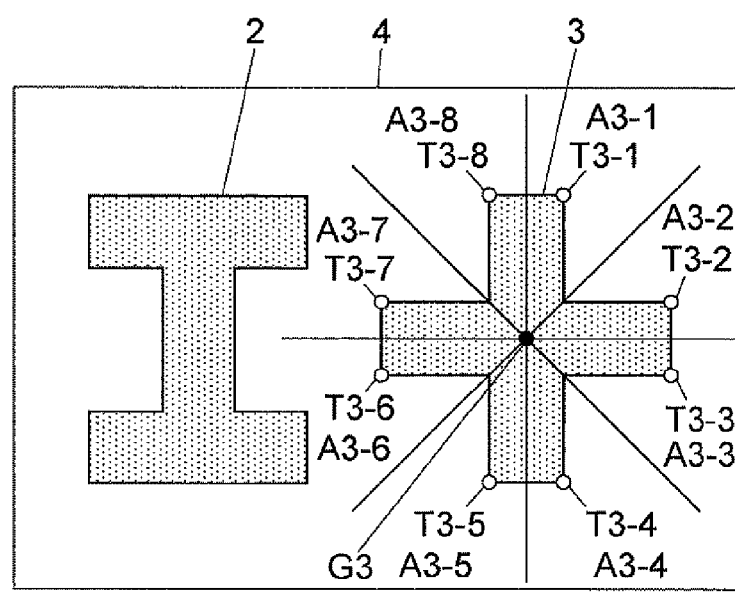
FIG. 7 illustrates an area dividing central point and lines for dividing an area of a second determined pattern into eight parts, and representative points of the second determined pattern.

FIG. 1 is a flowchart of a method of detecting the alignment mark as the target object according to the present embodiment. FIG. 2 illustrates a standard pattern. FIG. 3 illustrates an area dividing central point and lines for dividing an area of the standard pattern into eight parts. FIG. 4 illustrates standard pattern representative points. FIG. 5 illustrates a determined pattern image showing two determined patterns. FIG. 6 illustrates an area dividing central point and lines for dividing an area of a first determined pattern into eight parts. FIG. 6 also illustrates representative points of the first determined pattern. FIG. 7 illustrates an area dividing central point and lines for dividing an area of a second determined pattern into eight parts. FIG. 7 also illustrates second determined pattern representative points.

With reference to FIG. 1, in step S1, information of a standard pattern image including a standard pattern of the alignment mark is read. In step S2, a binarizing process is performed on the standard pattern image to extract the standard pattern of the alignment mark. The binarizing process may include converting the brightness of pixels into black and white values based on predetermined reference values. FIG. 2 illustrates the area of a standard pattern 1 extracted after the binarizing process.

In step S3, an area dividing central point G1 is set for dividing the area of the standard pattern 1 extracted in step S2. In accordance with the present embodiment, the area dividing central point G1 corresponds to the geometric center of the standard pattern 1. In FIG. 3, the area dividing central point G1 (geometric center) of the area of the standard pattern 1 is indicated by a black dot. In FIG. 3, the area of the standard pattern 1, which is shown solid black in FIG. 2, is indicated by a dot pattern so that the area dividing central point G1 can be clearly seen.

In step S4, the area of the standard pattern 1 is radially divided from the area dividing central point G1. The area of the standard pattern 1 may be divided into eight divided areas A1-1 through A1-8 by four lines passing through the area dividing central point G1, as illustrated in FIG. 3.

In step S5, in each of the divided areas A1-1 through A1-8, pixels of the standard pattern 1 that are located at the maximum distances from the area dividing central point G1 may be determined as standard pattern representative points T1-1 through T1-8. For example, the positions of the pixels corresponding to the standard pattern representative points T1-1 through T1-8 are indicated by white dots in FIG. 4.

In step S6, position information of the pixels corresponding to the standard pattern representative points T1-1 through T1-8 is stored as representative point information. In accordance with the present embodiment, coordinates information of the representative points is stored, assuming XY coordinates with the area dividing central point G1 as the origin. Alternatively, the coordinates information of the standard pattern representative points may be stored by assuming XY coordinates with a point other than the area dividing central point as the origin. Further alternatively, instead of assuming the XY coordinates, the coordinates information of the standard pattern representative points may be stored by assuming polar coordinates with the area dividing central point or another point as the origin (pole).

In step S7, information of a determined pattern image of an area around the alignment mark on the wafer is read. In step S8, a binarizing process and a labeling process are performed on the determined pattern image to extract a determined pattern. While in step S1 the information of the standard pattern image that is read includes only the standard pattern 1 of the alignment mark, the determined pattern image that is read in step S8 includes an area around the alignment mark. Thus, the determined pattern image may include pattern information of items or shapes other than the target object (alignment mark). For example, the determined pattern image 4 illustrated in FIG. 5 includes a first determined pattern 2 and a second determined pattern 3. The labeling process may involve adding a group attribute to each pixel and may be very effective in identifying an area of each of plural patterns in an image.

In step S9, a first determined pattern is selected. In accordance with the present embodiment, the first determined pattern 2 is selected. The following steps S10 through S14 are performed for each determined pattern extracted in step S8.

In step S10, the area dividing central point G2 for dividing the area of the first determined pattern 2 is set. Because the geometric center of the standard pattern 1 has been set in step S3 as the area dividing central point G1, the geometric center of the first determined pattern 2 is set as the area dividing central point G2 in step S10. The area dividing central point G2 of the first determined pattern 2 is indicated by a black dot in FIG. 6. In FIG. 6, the areas of the first determined pattern 2 and the second determined pattern 3, which are shown solid black in FIG. 5, are indicated by dot patterns in FIG. 6 so that the area dividing central point G2 can be clearly seen.

In step S11, the area of the first determined pattern 2 is radially divided from the area dividing central point G2. As illustrated in FIG. 6, the area of the first determined pattern 2 is divided into eight divided areas A2-1 through A2-8 by four lines passing through the area dividing central point G2, in the same way that the area of the standard pattern 1 is divided in step S4.

In step S12, in each of the divided areas A2-1 through A2-8, pixels of the first determined pattern 2 that are located at the maximum distances from the area dividing central point G2 are determined as the first determined pattern representative points T2-1 through T2-8. In FIG. 6, the positions of the pixels corresponding to the first determined pattern representative points T2-1 through T2-8 are indicated by white dots.

In step S13, a positional difference between the coordinates of the standard pattern representative points T1-1 through T1-8 and the coordinates of the first determined pattern representative points T2-1 through T2-8 are determined for each corresponding divided area. The coordinates of the first determined pattern representative points T2-1 through T2-8 may be determined with reference to the origin of the coordinates of the standard pattern representative points T1-1 through T1-8 registered in step S6. For example, when the coordinates information of the standard pattern representative points T1-1 through T1-8 is registered by assuming the XY coordinates with the area dividing central point G1 as the origin, the coordinates of the first determined pattern representative points T2-1 through T2-8 may be determined by assuming XY coordinates with the area dividing central point G2 as the origin. Then, the positional difference between the standard pattern representative points and the first determined pattern representative points may be determined for each corresponding divided area.

In step S14, it is determined whether the first determined pattern 2 is the target object. Specifically, it is determined whether the positional differences are within a predetermined range in all of the divided areas. The "predetermined range" may correspond to an area of 10 pixels. With reference to FIGS. 4 and 6, the positions of the standard pattern representative points T1-1 through T1-8 with respect to the area dividing central point G1 are clearly different from the positions of the first determined pattern representative points T2-1 through T2-8 with respect to the area dividing central point G2 in all of the divided areas. Thus, the positional differences between the standard pattern representative points and the first determined pattern representative points may not be within the predetermined range. Thus, it may be determined that the first determined pattern 2 is not the target object (alignment mark) ("No" in step S14).

In step S15, it is determined whether there is a determined pattern yet to be processed. Because the second determined pattern 3 is not processed yet ("Yes"), the routine proceeds to step S16. When there is no determined pattern to be processed ("No"), the process ends. In step S16, the next determined pattern is selected. For example, the second determined pattern 3 is selected, and then the routine returns to step S10.

In step S10, an area dividing central point G3 for dividing the area of the selected second determined pattern 3 is set. Here again, the geometric center of the second determined pattern 3 may be set as the area dividing central point G3. In FIG. 7, the area dividing central point G3 of the second determined pattern 3 is indicated by a black dot. The areas of the first determined pattern 2 and the second determined pattern 3, which are shown solid black in FIG. 5, are indicated by dot patterns in FIG. 7 so that the area dividing central point G3 can be clearly seen.

In step S11, the area of the second determined pattern 3 is radially divided from the area dividing central point G3. For example, the area of the second determined pattern 3 is divided into eight divided areas A3-1 through A3-8 by four lines passing through the area dividing central point G3, as illustrated in FIG. 7, in the same way that the area of the standard pattern 1 is divided in step S4.

In step S12, in each of the divided areas A3-1 through A3-8, pixels of the second determined pattern 3 that are located at the maximum distances from the area dividing central point G3 are determined as the second determined pattern representative points T3-1 through T3-8. In FIG. 7, the positions of the pixels corresponding to the second determined pattern representative points T3-1 through T3-8 are indicated by white dots.

In step S13, a positional difference between the coordinates of the standard pattern representative points T1-1 through T1-8 and those of the second determined pattern representative points T3-1 through T3-8 is determined for each corresponding divided area. The coordinates of the second determined pattern representative points T3-1 through T3-8 may be determined with reference to the origin of the coordinates of the standard pattern representative points T1-1 through T1-8 registered in step S6. Then, the positional differences between the standard pattern representative points and the second determined pattern representative points may be determined for each corresponding divided area.

In step S14, it is determined whether the second determined pattern 3 is the target object. With reference to FIGS. 4 and 7, the positions of the standard pattern representative points T1-1 through T1-8 with reference to the area dividing central point G1 are the same or substantially the same as the positions of the second determined pattern representative points T3-1 through T3-8 with reference to the area dividing central point G3 in all of the divided areas. Thus, the positional differences between the standard pattern representative points and the second determined pattern representative points may be within a predetermined range. In this case, it may be determined that the second determined pattern 3 is the target object (alignment mark) ("Yes"), and the process may be terminated.

In accordance with the present embodiment, because it is determined whether the determined pattern is the target object standard pattern by using the representative points T1-1 through T1-8 and the determined pattern representative points T2-1 through T2-8 and T3-1 through T3-8, the amount of information that is processed is less than that of related-art pattern matching methods. Thus, the target object can be detected at high speed.

Further, because the information of the previously registered standard pattern is that of the standard pattern representative points T1-1 through T1-8, the amount of information that is registered is less than in the case where the information of the entire standard pattern is registered.

In accordance with the present embodiment, the determination process is first performed for the first determined pattern 2 of the determined patterns 2 and 3. However, the order of the determination process in the case of plural determined patterns is not particularly limited. For example, the determination process may be performed for the second determined pattern 3 first. In this case, the process may end upon determination that the second determined pattern 3 is the target object (alignment mark) ("Yes" in step S14), and no further determination process may be performed for the first determined pattern 2. However, even upon determination that any of plural determined patterns is the target object, the determination process may be continued for one or more remaining un-processed determined patterns. In this case, when it is determined that plural determined patterns correspond to the target object and when it is preferable to select only one of the determined patterns as the target object, the determined pattern having the smallest total value of the positional differences may be selected as the target object.

In accordance with the present embodiment, if the target object cannot be obtained after performing the process of steps S10 through S14 for one selected determined pattern, then the same process may be performed for the next determined pattern. Preferably, after the determined pattern representative points are determined for each of plural determined patterns, the target object determination step may be performed for each of the determined patterns.

Preferably, when it is possible that the magnification ratio of the images may vary due to different distances between the camera and the imaged object, for example, the determined pattern representative point information may be corrected after the determined pattern representative points are selected in step S12, and then the positional differences may be calculated in step S13.

In a specific method of correcting the representative point information, the coordinates information of the determined pattern representative points T2-1 through T2-8 or T3-1 through T3-8 may be corrected as follows. For example, the magnification ratio of the area of the first determined pattern 2 is varied such that the distance between the standard pattern representative point T1-1 and the area dividing central point G1 in FIG. 4 is equal to the distance between the first determined pattern representative point T2-1 corresponding to the standard pattern representative point T1-1 and the divided area central point G2 in the first determined pattern 2 (FIG. 6). Also, the magnification ratio of the area of the second determined pattern 3 may be varied such that the distance between the standard pattern representative point T1-1 and the area dividing central point G1 illustrated in FIG. 4 is equal to the distance between the second determined pattern representative point T3-1 corresponding to the standard pattern representative point T1-1 and the divided area central point G3 in the area of the second determined pattern 3 (FIG. 7).

Preferably, after varying the magnification ratio for correcting the coordinates positions of the determined pattern representative points, if, with respect to the X coordinate or the Y coordinate, the difference between the minimum coordinate value and the maximum coordinate value of the standard pattern and the difference between the minimum coordinate value and the maximum coordinate value of the determined pattern are equal to or more than a predetermined value, such as 10 pixels, the determination process of step S14 may be omitted for the particular determined pattern.

Figure 8:
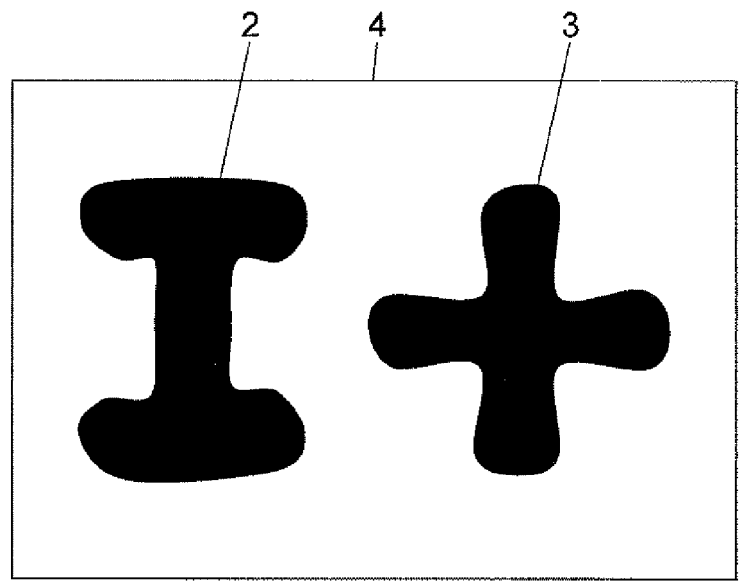
FIG. 8 illustrates a determined pattern image including two rounded determined patterns.

The alignment mark or other patterns formed in the photoengraving step or etching step of a semiconductor device manufacturing process may be rounded, as illustrated in FIG. 8. In such a case, in the case of an alignment mark, for example, it may not be possible to detect a determined pattern that is completely identical in terms of coordinates of the representative points of a pre-registered standard pattern. In accordance with the present embodiment, as described above, it is determined that the determined pattern is the target object when the positional differences between the coordinates of the standard pattern representative points and the coordinates of the determined pattern representative points are within the preset range, thus enabling an accurate detection of even a rounded alignment mark or target pattern.

Figure 9:
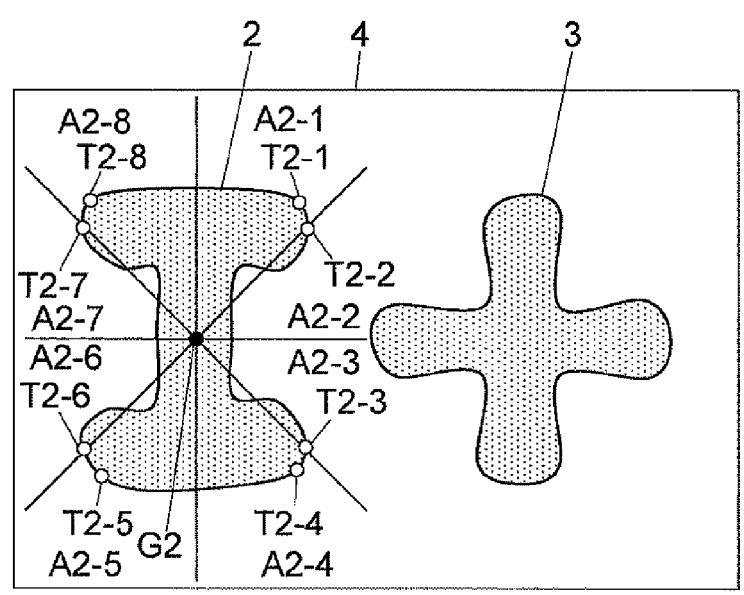
FIG. 9 illustrates an area dividing central point and lines for dividing an area of a first round determined pattern into eight parts, and representative points of the first determined pattern.
Figure 10:
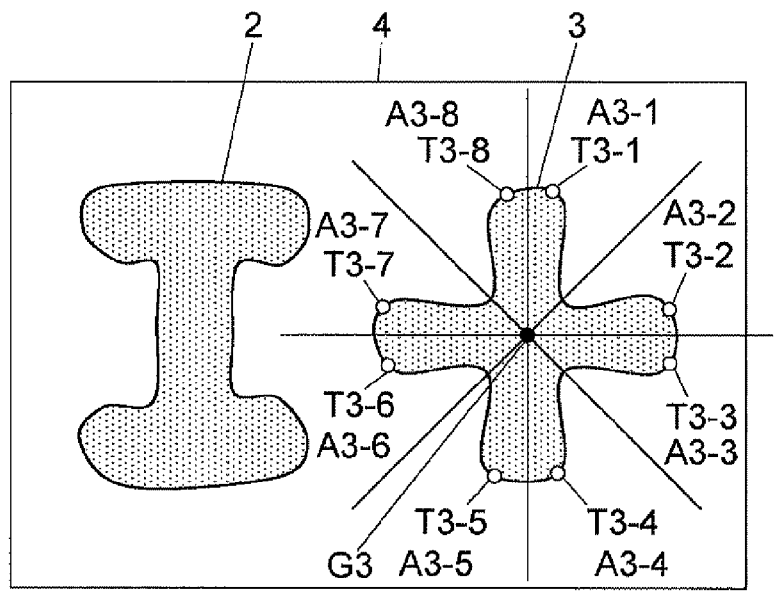
FIG. 10 illustrates an area dividing central point and lines for dividing an area of a second round determined pattern, and representative points of the second determined pattern.

FIG. 9 illustrates the area dividing central point G2 and lines for dividing the area of a rounded first determined pattern 2 into eight parts, and their first determined pattern representative points T2-1 through T2-8. FIG. 10 illustrates the area dividing central point G3 and lines for dividing the area of a rounded second determined pattern 3 into eight parts, and their second determined pattern representative points T3-1 through T3-8.

As illustrated in FIGS. 9 and 10, even when the determined pattern 2 or 3 is rounded, the second determined pattern representative points T3-1 through T3-8 may be obtained substantially at the same positions as the standard pattern representative points T1-1 through T1-8 illustrated in FIG. 4. Thus, the second determined pattern 3 may be determined as the target object (alignment mark).

Figure 11:
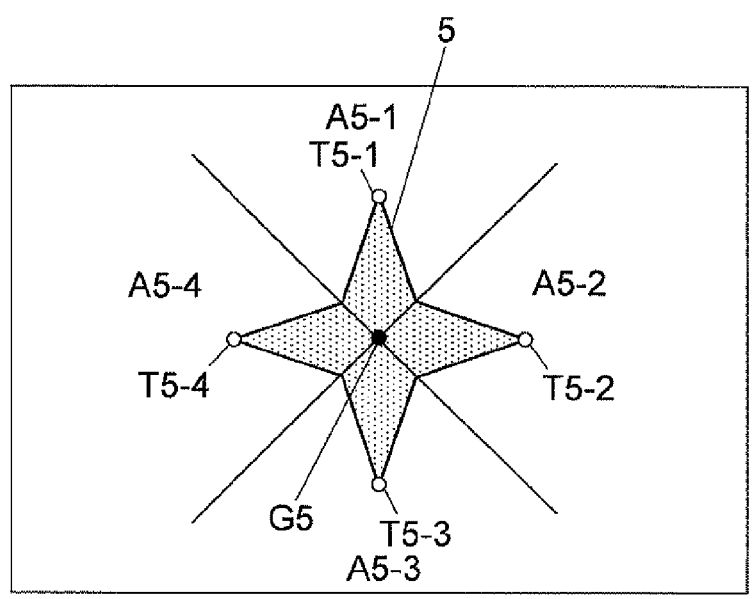
FIG. 11 illustrates another example of the standard pattern, an area dividing central point and lines for dividing an area of the standard pattern into four parts, and representative points of the standard pattern.

In the foregoing embodiment, the area of the standard pattern and those of the determined patterns are divided into eight parts. Preferably, the number of the divided areas or their positions may be determined depending on the pattern shape of the detected object. The number of the divided areas may be two or more. For example, as illustrated in FIG. 11, the area of a standard pattern 5 is divided into four divided areas A5-1 through A5-4 with respect to the geometric center of the standard pattern 5 as the area dividing central point G5, thus obtaining four standard pattern representative points T5-1 through T5-4.

Figure 12:
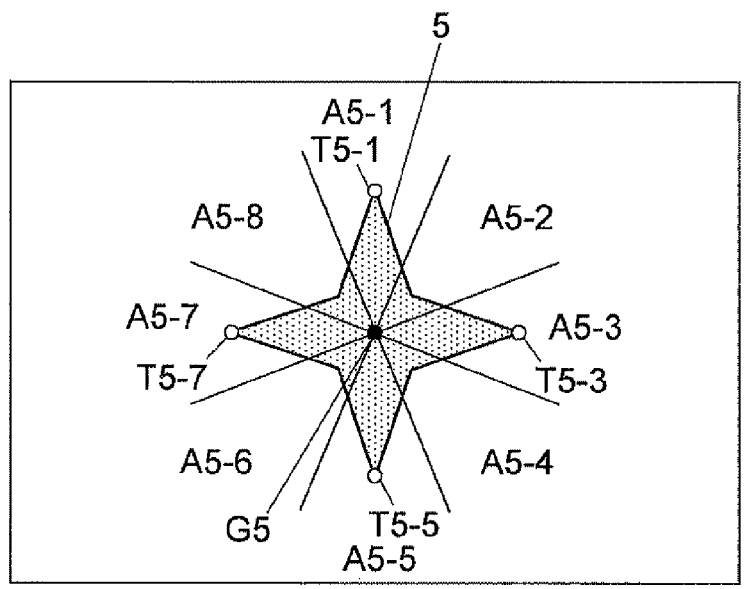
FIG. 12 illustrates another example of the standard pattern, an area dividing central point and lines for dividing an area of the standard pattern into eight parts, and representative points of the standard pattern, where some of the divided areas do not have the representative points.

The representative points may not be selected in one or more of plural divided areas. For example, in a case where the area of the standard pattern 5 is divided into eight divided areas A5-1 through A5-8 as illustrated in FIG. 12, no representative points may be selected in the divided areas A5-2, A5-4, A5-6, and A5-8 while the standard pattern representative points T5-1, T5-3, T5-5, and T5-7 are selected in the divided areas A5-1, A5-3, A5-5, and A5-7.

In the foregoing embodiment, in the process of selecting the standard pattern representative points or the determined pattern representative points, the selecting process is performed with regard to all of the pixels of the standard pattern or the determined pattern. Alternatively, similar results may be obtained by performing the representative point selecting process only with regard to the pixel information of an outline portion of the standard pattern or the determined pattern. In this case, the representative point selecting process may be performed faster than in the case of performing the representative point selecting process with regard to all of the pixels of the standard pattern or the determined pattern. An example is described with reference to a standard pattern.

Figure 13:
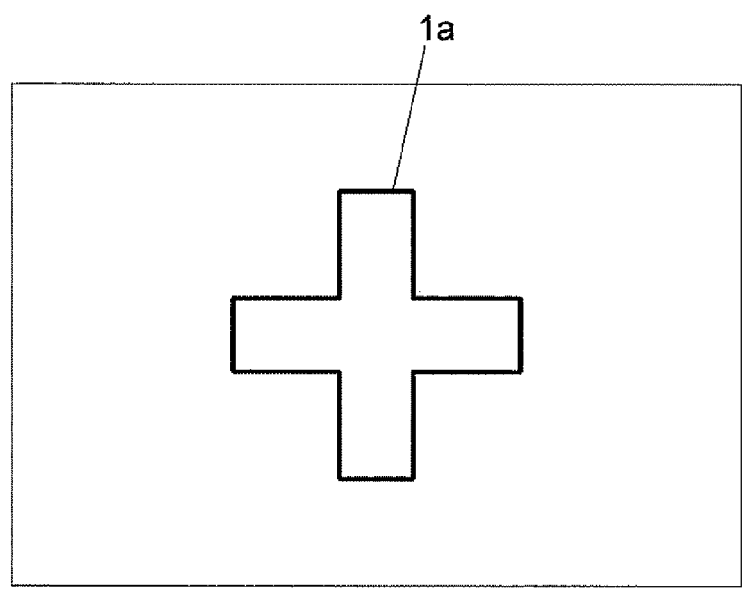
FIG. 13 illustrates a result of an edge detection process performed on the standard pattern of FIG. 3.

The pixel information of an outline portion of a pattern may be obtained by a method which may be generally referred to as "edge detection", by which a pattern outline is calculated based on changes in image brightness. FIG. 13 illustrates the result of an edge detection process performed on the standard pattern 1 illustrated in FIG. 2. By performing the edge detection process on the standard pattern 1, a standard pattern outline portion 1a is obtained.

Figure 14:
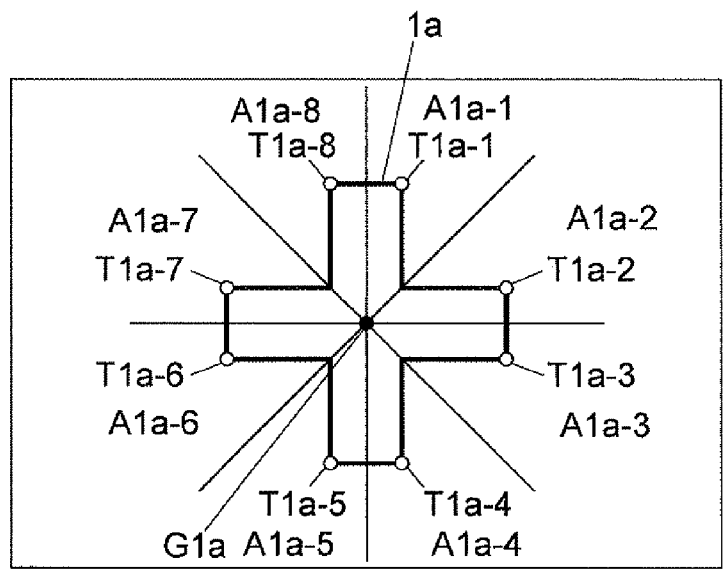
FIG. 14 illustrates an area dividing central point and lines for dividing an area of an outline portion of the standard pattern of FIG. 13 into eight parts, and representative points of the standard pattern.

FIG. 14 illustrates an area dividing central point G1a and lines for dividing the area of the standard pattern outline portion 1a of FIG. 13 into eight parts, and their standard pattern representative points. In the illustrated example, the area dividing central point G1a corresponds to the geometric center of the standard pattern outline portion 1a. The area of the standard pattern outline portion 1a is divided into eight divided areas A1a-1 through A1a-8 under the same conditions (such as the method of setting the area dividing central point and the method of area division) as in the case of area division described with reference to FIG. 3. As a result, standard pattern representative points T1a-1 through T1a-8 are obtained. The positions of the standard pattern representative points T1a-1 through T1a-8 with respect to the area dividing central point G1a are the same as the positions of the standard pattern representative points T1-1 through T1-8 with respect to the area dividing central point G1 (see FIGS. 4 and 14).

Preferably, in the case where the representative point selecting process is performed by using the outline portion of a pattern, pixel positions at the minimum distances from the area dividing central point may be selected as representative points.

Figure 15:
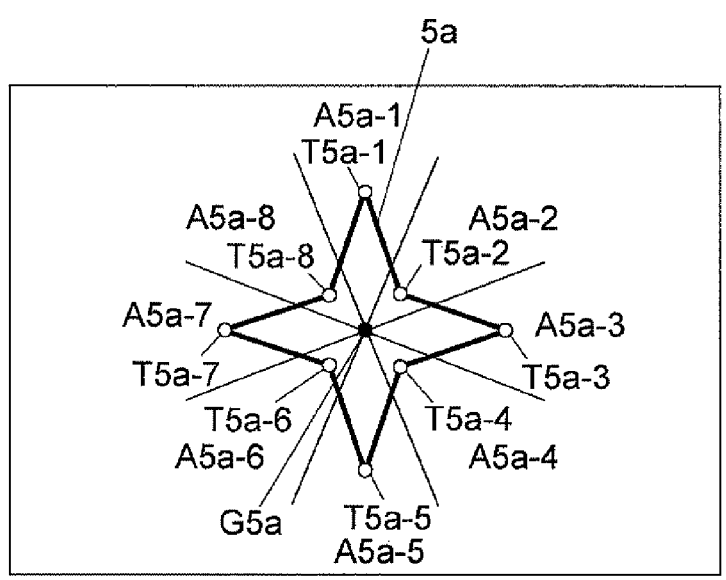
FIG. 15 illustrates another example of the standard pattern, an area dividing central point and lines for dividing an area of an outline portion of the standard pattern into eight parts, and representative points of the standard pattern.

Preferably, the method of determining the representative points may be varied from one divided area to another. For example, as illustrated in FIG. 15, a standard pattern outline portion 5a is determined for the standard pattern 5 illustrated in FIG. 12. The geometric center of the standard pattern outline portion 5a is set as the area dividing central point G5a, and, for the divided areas A5a-1, A5a-3, A5a-5, and A5a-7 among the eight divided areas A5a-1 through A5a-8, pixel positions of the standard pattern outline portion 5a that are at the maximum distances from the area dividing central point G5a are selected as the standard pattern representative points T5a-1, T5a-3, T5a-5, and T5a-7. With regard to the divided areas A5a-2, A5a-4, A5a-6, and A5a-8, the pixel positions of the standard pattern outline portion 5a that are at the minimum distances from the area dividing central point G5a are selected as the standard pattern representative points T5a-2, T5a-4, T5a-6, and T5a-8, respectively.

Thus, a divided area in which the pixel coordinates of a position at the maximum distance from the area dividing central point are selected as a representative point may be present together with a divided area in which the pixel coordinates of a position at the minimum distance from the area dividing central point are selected as a representative point.

In the foregoing embodiment, the information of the standard pattern representative points is obtained by using the image information of the standard pattern in steps S1 through S5 of the flowchart of FIG. 1. Preferably, the information of the standard pattern representative points may be obtained based on design data.

For example, when it is determined in advance that, in the case of the standard pattern 1 illustrated in FIG. 2, the geometric center of the standard pattern 1 is set as the area dividing central point (method of setting the area dividing central point), and that the area of the standard pattern 1 is divided into eight divided areas with respect to the area dividing central point as illustrated in FIG. 3 (method of setting the divided areas), an operator may be able to readily select the coordinates positions of the standard pattern representative points T1-1 through T1-8 (see FIG. 4) of the standard pattern 1, based on design data.

Figure 16:
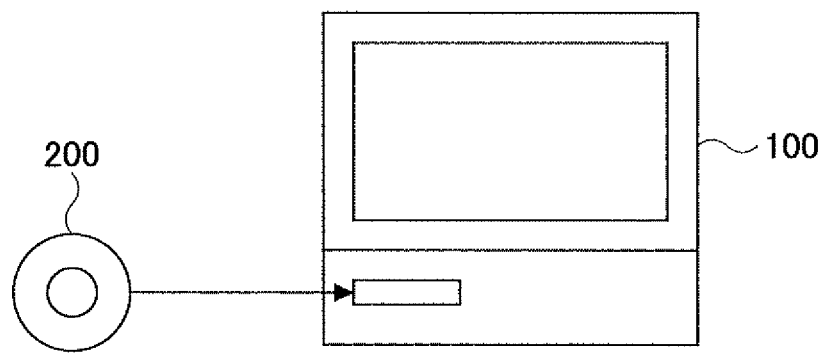
FIG. 16 illustrates a computer and a non-transitory computer-readable recording medium that stores a program that causes the computer to perform an object detecting method.

The steps of the foregoing embodiment may be realized by executing a program that causes a computer to perform the steps. The program may be stored in a non-transitory computer-readable recording medium 200 and downloaded therefrom into a computer 100, as illustrated in FIG. 16.

Although this invention has been described in detail with reference to certain embodiments, variations and modifications exist within the scope and spirit of the invention as described and defined in the following claims.

For example, the steps of the foregoing embodiments may be performed without drawing the figures with reference to which the foregoing embodiments have been described. While the alignment mark is used as a target object in the foregoing embodiments, the target object is not limited to an alignment mark and may include any pattern shape.

The standard pattern may be drawn or imaged. Also, the determined pattern may be drawn or imaged. An embodiment of the present invention may be applied to an operation for detecting a specific pattern shape in a drawn or imaged image, such as a wafer positioning operation during a size-measuring step of a semiconductor manufacturing process.

The determined pattern representative point selecting step may be performed under the same conditions as in the standard pattern representative point selecting step. Specifically, in both of the representative point selecting steps, the area dividing central point may be set or the area may be divided by the same methods. Thus, for the two representative point selecting steps, the coordinates of the area dividing central point may be the same or different.

The standard pattern representative point selecting step and the determined pattern representative point selecting step may include setting a center or the geometric center of a pattern as the area dividing central point. The "center" of the pattern may include a point with coordinate values obtained by dividing in half a sum of the maximum value and the minimum value of each of the variables of the plural pixel coordinates (which are pairs of the variables) indicating the positions of the pixels of the pattern. The "geometric center" of the pattern may include a point with coordinates of an average value of each the variables of the plural pixel coordinates (which are pairs of the variables) indicating the positions of the pixels of the pattern.

The standard pattern representative point selecting step and the determined pattern representative point selecting step may include not performing the representative point selecting process in a pre-designated first divided area of the divided areas.

The standard pattern representative point selecting step and/or the determined pattern representative point selecting step may include selecting the representative points by using only the pixel information of an outline portion of the pattern. The pixel information of the outline portion of the pattern may be determined by an edge extracting process. However, this does not exclude the selection of the representative points by using the pixel information of the entirety of the standard pattern or the determined pattern in the corresponding representative point selecting step.

When the center or the geometric center of the standard pattern or the determined pattern is set as the area dividing central point, the representative point selecting steps may include determining the area dividing central point by using only the pixel information of the outline portion of the pattern, or the pixel information of the entire pattern.

In the representative point selecting step in which the representative points are selected by using only the pixel information of the outline portion of the pattern, a pattern pixel position located at the minimum distance from the area dividing central point may be selected as a representative point as regards a pre-designated second divided area of the divided areas.

In the object detecting method according to an embodiment, the standard pattern representative point selecting step may include setting a standard pattern pixel position selected in advance based on design data of a standard pattern as a standard pattern representative point, instead of processing actual image information. When the method of setting the area dividing central point and the divided area setting method are determined, an operator can easily select the coordinates position of the standard pattern representative point selected with reference to the standard pattern based on the design data.

The standard pattern and the determined pattern may include an alignment mark used for positioning a semiconductor wafer. In accordance with an embodiment, a non-transitory computer-readable recording medium may store an object detection program configured to cause a computer to perform the steps of the object detecting method.

In the object detecting method according to an embodiment, the object determination step includes determining whether a determined pattern is a target object by using the standard pattern representative points obtained in the standard pattern representative point selecting step and the determined pattern representative points obtained in the determined pattern representative point selecting step. Thus, the method requires less information than a related-art pattern matching method, thus enabling a high-speed detection of the target object.

Further, in the object detecting method according to an embodiment, when the information corresponding to the standard pattern is registered in advance, the information of the standard pattern representative points may be registered. Thus, the method of the embodiment requires less information that needs to be registered than in the case of registering the information of the entire standard pattern.

In the object detecting method according to an embodiment, the standard pattern representative point selecting step or the determined pattern representative point selecting step may include setting the geometric center of the pattern as the area dividing central point. In this way, when the steps of the method are performed by a computer, the area dividing central point suitable for the standard pattern or the determined pattern may be automatically set without the operator setting the area dividing central point.

The standard pattern representative point selecting step or the determined pattern representative point selecting step may include not performing the representative point selecting process as regards a pre-designated first divided area of the divided areas. In this way, a representative point suitable for the standard pattern or the determined pattern may be selected.

The standard pattern representative point selecting step and/or the determined pattern representative point selecting step may include selecting the representative point by only using the pixel information of an outline portion of a pattern. In this way, the information processing time can be reduced compared to when the image information of the entire pattern is used.

The representative point selecting step in which the representative point is selected by using only the pixel information of the outline portion of the pattern may include selecting a pattern pixel position located at the minimum distance from the area dividing central point as the representative point as regards a pre-designated second divided area of the divided areas. In this way, a representative point suitable for the standard pattern or the determined pattern may be selected.

In the object detecting method according to an embodiment, the standard pattern representative point selecting step may include setting, as the standard pattern representative point, a standard pattern pixel position that is selected based on design data of a standard pattern in advance, instead of processing actual image information. In this way, the time for the processing of selecting the standard pattern pixel position at the maximum distance from the area dividing central point as regards the standard pattern may be omitted.

A non-transitory computer-readable recording medium according to an embodiment stores an object detection program configured to cause a computer to perform the steps of the object detecting method. Thus, the object detecting method according to an embodiment may be performed by the computer.

The present application is based on Japanese Priority Application No. 2010-100743 filed Apr. 26, 2010, the entire contents of which are hereby incorporated by reference.

What is claimed is:

1. An object detecting method performed by a computer executing instructions of a program embodied in a non-transitory computer-readable medium, said method performed by the computer comprising:
   dividing an area of a standard pattern into two or more areas radially from an area dividing central point;
   selecting, in each of the divided areas of the standard pattern, a standard pattern pixel position at the maximum distance from the area dividing central point as a standard pattern representative point;
   dividing an area of a determined pattern into two or more areas under the same condition as in the selecting of the standard pattern representative point and with reference to the area dividing central point;
   selecting, in each of the divided areas of the determined pattern, a determined pattern pixel position at the maximum distance from the area dividing central point as a determined pattern representative point;
   determining a positional difference between the coordinates of the standard pattern representative points and the coordinates of the determined pattern representative points in the corresponding divided areas; and
   determining the determined pattern as a target object when the positional differences in all of the divided areas are within a predetermined range,
   wherein each of the selecting of the standard pattern representative point and the selecting of the determined pattern representative point includes setting a center or a geometric center of the corresponding pattern as the area dividing central point.

2. An object detecting method performed by a computer executing instructions of a program embodied in a non-transitory computer-readable medium, said method performed by the computer comprising:
   dividing an area of a standard pattern into two or more areas radially from an area dividing central point;
   selecting, in each of the divided areas of the standard pattern, a standard pattern pixel position at the maximum distance from the area dividing central point as a standard pattern representative point;
   dividing an area of a determined pattern into two or more areas under the same condition as in the selecting of the standard pattern representative point and with reference to the area dividing central point;
   selecting, in each of the divided areas of the determined pattern, a determined pattern position at the maximum distance from the area dividing central point as a determined pattern representative point;
   determining a positional difference between the coordinates of the standard pattern representative points and the coordinates of the determined pattern representative points in the corresponding divided areas; and
   determining the determined pattern as a target object when the positional differences in all of the divided areas are within a predetermined range,
   wherein each of the selecting of the standard pattern representative point and the selecting of the determined pattern representative point includes not selecting the corresponding representative point in a pre-designated first divided area of the corresponding divided areas.

3. An object detecting method performed by a computer executing instructions of a program embodied in a non-transitory computer-readable medium, said method performed by the computer comprising:
   dividing an area of a standard pattern into two or more areas radially from an area dividing central point;
   selecting, in each of the divided areas of the standard pattern, a standard pattern pixel position at the maximum distance from the area dividing central point as a standard pattern representative point;
   dividing an area of a determined pattern into two or more areas under the same condition as in the selecting of the standard pattern representative point and with reference to the area dividing central point;
   selecting, in each of the divided areas of the determined pattern, a determined pattern pixel position at the maximum distance from the area dividing central point as a determined pattern representative point;
   determining a positional difference between the coordinates of the standard pattern representative points and the coordinates of the determined pattern representative points in the corresponding divided areas; and
   determining the determined pattern as a target object when the positional differences in all of the divided areas are within a predetermined range,
   wherein the selecting of the standard pattern representative point and/or the selecting of the determined pattern representative point includes selecting the representative point by only using pixel information of an outline portion of the corresponding pattern, and
   wherein the selecting of the representative point by using only the pixel information of the outline portion includes selecting a pattern pixel position at the minimum distance from the area dividing central point as the representative point as regards a pre-designated second divided area of the divided areas.

4. The object detecting method according to claim 1, wherein the selecting of the standard pattern representative point includes setting, as the standard pattern representative point, a standard pattern pixel position that is selected in advance based on design data of the standard pattern without processing actual image information.

5. The object detecting method according to claim 1, wherein each of the standard pattern and the determined pattern includes an alignment mark used for positioning of a semiconductor wafer.

6. The non-transitory computer-readable recording medium storing the program that causes the computer to perform the object detecting method according to claim 1.

7. The non-transitory computer-readable recording medium storing the program that causes the computer to perform the object detecting method according to claim 2.

8. The non-transitory computer-readable recording medium storing the program that causes the computer to perform the object detecting method according to claim 3.

* * * * *